Aug. 28, 1928.

J. LEDWINKA 1,681,942

COWL VENTILATOR

Filed Nov. 20, 1926

Inventor:
Joseph Ledwinka,
By John P. Earl

Patented Aug. 28, 1928.

1,681,942

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

COWL VENTILATOR.

Application filed November 20, 1926. Serial No. 149,705.

This invention relates to a ventilator gasket. It more particularly relates to a gasket for ventilators, such as are used upon the cowl of automobiles, although it could be used in a variety of other relations.

The main objects of the invention are to provide a gasket for a cowl ventilator or other place, which is capable of application to the place where it is to be used as a self-contained unit, which is of simple construction, which also serves as a finishing means for the ventilator opening, and which obviates the necessity for providing flanges or other means about the ventilator opening.

Additional objects and advantages will become apparent as the description proceeds.

In carrying the invention into practice a one-piece ferrule or gasket is formed of resilient material, preferably rubber, which may be slipped over the edges of the ventilator opening and held in place thereon by its own resiliency. The gasket, of course, will take the form of the opening. In order to reinforce the gasket a metal insert is molded into the same.

The embodiment shown in the drawing and described herein discloses the gasket as used with the cowl ventilator of an automobile body. Although such use is the preferred one, it should be understood that the gasket is capable of use in a great number of ways.

The drawing shows the gasket applied to a cowl ventilator, the views thereof being, as follows.

Figure 1:
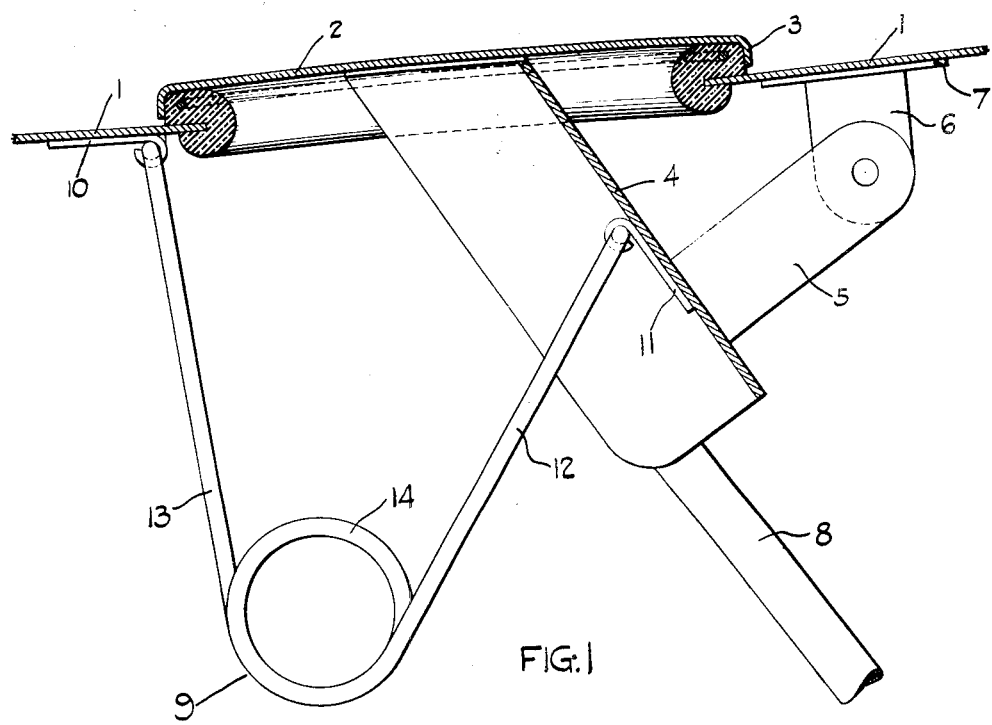
Fig. 1 is a vertical section taken on line 1—1 of Fig. 2.
Figure 2:
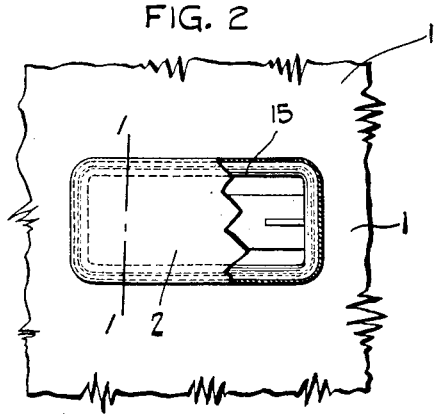
Fig. 2 is a top plan view of the ventilator and cowl, a portion of the ventilator shutter being broken away.
Figure 3:
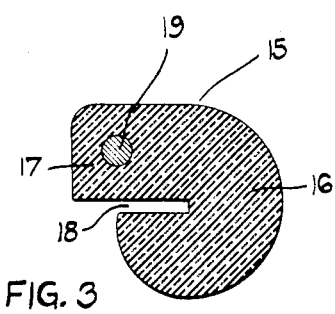
Fig. 3 is a vertical section through the gasket.

The cowl panel is indicated in the drawing as 1, and may comprise any preferred form. An opening is provided in the top of the cowl panel in the usual manner, such opening forming the ventilator opening and communicating with the space beneath the cowl.

A ventilator shutter 2 having its edges downturned to form a continuous flange 3 is adapted to cover the opening when in its closed position. The configuration of the opening and shutter is preferably rectangular, although any other shape could be used. The shutter is mounted so as to tilt upwardly toward the windshield or rear of the cowl, whereby when it is in its open position it will act as a baffle or deflector plate to direct the air through the opening.

The shutter may be operatively mounted in any number of ways, the mounting means shown being simply illustrative. Depending from the center of the shutter and sloping backwardly at an oblique angle is an apron or arm 4. This apron is preferably of channel formation. An arm or link 5 extends from the web portion of the channeled apron adjacent one end thereof. This arm or link is pivotally connected to a stud 6 carried by a plate 7 secured to the undersurface of the cowl panel. An operating arm 8 is connected to the apron so that the shutter may be raised or lowered. This arm can extend backward toward the front seat in any preferred manner.

It is apparent that movement of the arm 8 will swing the shutter, apron, and link; the latter element carrying the first two in an arc because of its pivotal connection with the fixed stud 6.

In order to hold the shutter in either its opened or closed position a spring 9 is provided. This spring has one end secured to a plate 10, which in turn is fastened to the under surface of the cowl panel in front of the ventilator opening and the other end to a plate 11 arranged within the channeled apron at about its middle portion. The spring has two converging arms 12 and 13 with a coil portion 14 at the junction point of these arms. When the shutter is in closed position, the connection of the arm 12 with the apron 4 is below the pivot between link 5 and stud 6. The spring, therefore, tends in this position to hold the shutter closed. The shutter being opened the spring connection to the apron is above the pivot, consequently the shutter is held open.

The foregoing description covers more or less conventional construction, which by itself does not form a part of the invention, although it is otherwise when the construction is taken in combination with the gasket.

The gasket which it is contemplated using comprises a molded one piece rubber ferrule 15, which will have the same configuration as the opening. This ferrule or gasket has a substantially cylindrical portion 16 and a flange portion 17. Intermediate these portions a continuous groove 18 is provided. In order to reinforce the gasket and enable it to maintain its shape a metal reinforcement 19 is molded therein. This reinforcement may be a wire, band, or other metallic member and extends the entire extent of the gasket.

The gasket is slipped over the edges of the cowl panel at the ventilator opening, the groove 18 engaging such edges and holding the gasket in place.

The use of a gasket of this form removes the necessity of providing flanges on the cowl panel at the ventilator opening, as well as doing away with the use of fastening screws now employed for securing the rubber or felt inserts.

It is also unnecessary to finish the edges of the opening since the gasket itself completely conceals the same. The foregoing description has shown that the gasket provides a permanent waterproof seating for the ventilator shutter in combination with the downturned flanges of the latter.

Having described an embodiment of the invention, the following claims are herewith appended with the understanding that the invention is only to be limited within the scope of such claims.

What I claim is:

1. In combination, an automobile body cowl having an opening therein, a one-piece rubber packing ring having a slit in its outer periphery adapted to embrace the edges of said opening, and a cover for said opening having downturned flanges engaging the outer periphery of the packing ring.

2. A ventilator gasket comprising a one-piece rubber packing ring adapted to conform to the configuration of the ventilating opening, said ring having a substantially cylindrical portion adjacent the inner periphery thereof, a lateral flange portion adjacent the outer periphery thereof, and a slit extending inwardly of said cylindrical portion, whereby said ring may be slipped into position around the periphery of the ventilating opening and said slit embrace the edges thereof.

3. A ventilator gasket comprising a one-piece rubber packing ring adapted to conform to the configuration of the ventilating opening, said ring having a substantially cylindrical portion adjacent the inner periphery thereof, a slit extending inwardly of said cylindrical portion and a lateral flange portion adjacent the outer periphery thereof, and a reinforcement within said lateral flange portion.

4. In combination, an automobile body cowl having an opening therein, a one-piece rubber packing ring having a reinforcement embedded therein, and a slit in its outer periphery adapted to embrace the edges of said opening, and a cover for said opening having downturned flanges engaging the outer periphery of the packing ring.

5. In combination, an automobile body panel of sheet metal having a ventilator opening therein, a rubber gasket enclosing within the body of its cross section the edges of said opening and supported in position by virtue of such enclosure, together with a cover for said opening arranged to bear upon said gasket in closed position.

6. In combination, an automobile body panel of sheet metal having a ventilator opening therein having marginal edges lying in the plane of the opening, a rubber gasket enclosing within the body of its cross section the edges of said opening and supported in position by virtue of such enclosure, together with a cover for said opening arranged to bear upon said gasket in closed position.

In testimony whereof he hereunto affixes his signature.

JOSEPH LEDWINKA.